US007913792B2

(12) United States Patent
Bruno

(10) Patent No.: US 7,913,792 B2

(45) Date of Patent: Mar. 29, 2011

(54) ELECTRIC FORK-LIFT TRUCK AND PROCESS FOR MANUFACTURING THE SAME

(75) Inventor: Rocco Bruno, Grugliasco (IT)

(73) Assignee: V. Mariotti S.r.l., Grugliasco (IT)

( * ) Notice: Subject to any disclaimer, the term of this patent is extended or adjusted under 35 U.S.C. 154(b) by 359 days.

(21) Appl. No.: 12/089,576

(22) PCT Filed: Oct. 7, 2006

(86) PCT No.: PCT/IB2006/002796

§ 371 (c)(1),
(2), (4) Date: Apr. 8, 2008

(87) PCT Pub. No.: WO2007/042896

PCT Pub. Date: Apr. 19, 2007

(65) Prior Publication Data

US 2008/0232943 A1 Sep. 25, 2008

(30) Foreign Application Priority Data

Oct. 10, 2005 (IT) .............................. TO2005A0716

(51) Int. Cl.
*B62D 61/12* (2006.01)

(52) U.S. Cl. ......... 180/209; 180/214; 180/216; 414/631

(58) Field of Classification Search .................. 180/209, 180/214, 24.02, 216; 414/631, 635, 639, 414/641

See application file for complete search history.

(56) References Cited

U.S. PATENT DOCUMENTS

| | | | | |
|---|---|---|---|---|
| 3,071,270 A | | 1/1963 | Baker | |
| 3,567,053 A | * | 3/1971 | Willock | 414/620 |
| 3,734,327 A | * | 5/1973 | Ellis, Jr. | 414/667 |
| 4,359,127 A | * | 11/1982 | Arnold | 180/252 |
| 4,692,086 A | * | 9/1987 | Morita et al. | 414/635 |
| 5,131,801 A | * | 7/1992 | Melanson | 414/635 |
| 5,184,699 A | * | 2/1993 | Aoki et al. | 187/224 |
| 5,190,435 A | * | 3/1993 | Epstein | 414/635 |
| 5,482,141 A | | 1/1996 | Wilson | |
| 6,079,935 A | * | 6/2000 | Brunner et al. | 414/641 |
| 6,398,480 B1 | | 6/2002 | Baginski et al. | |
| 6,557,658 B1 | * | 5/2003 | Enmeiji et al. | 180/236 |
| 6,732,824 B2 | * | 5/2004 | Sugata | 180/65.51 |
| 6,866,113 B2 | * | 3/2005 | Sugata | 180/253 |

* cited by examiner

*Primary Examiner* — Toan C To

(74) *Attorney, Agent, or Firm* — Jason D. Voight

(57) ABSTRACT

The fork-lift truck comprises a body (11) with one or more directional rear wheels and a mast (12) with a slide (13) sliding and hearing front forks for gripping and supporting the load. According to the invention, the truck comprises an intermediate frame (14), bearing the front wheels (21; 22) and oscillating with respect to the body (11) around a transversal axis (X-X) parallel to the axis (Y-Y) of the front wheels, as well as operating-cylinder means (30) interposed between said frame and said body. Said mast (12) is dismountably fastened to said intermediate frame (14), so as to be made to oscillate integrally with the frame itself around said transversal axis (X-X) by means of said operating-cylinder means (30) to swing forwards and rearwards, with both idle (21) and driving (22) front wheels, whereas it can be easily disassembled and assembled with respect to the intermediate frame (14).

11 Claims, 10 Drawing Sheets

ELECTRIC FORK-LIFT TRUCK AND PROCESS FOR MANUFACTURING THE SAME

The present invention relates to an electric fork-lift truck. Furthermore, the invention relates to a process for manufacturing the same.

A known electric fork-lift truck mainly comprises a unitized body and a so-called "mast", arranged in the front side of the unitized body.

The unitized body, equipped with a safety roof, includes the passenger compartment for the operator with related controls, circuits and control means, as well as compartments for housing the electric battery and the ballast. Furthermore, one or more rear, directional wheels with possible motor means and motion-transmitting means, in case of rear-wheel driven or four-wheel driven truck, are connected to the unitized body.

The mast substantially includes a stiff rectangular supporting and guiding frame, extended in height and in case extensible vertically, and a slide sliding in vertical direction along said frame and bearing a pair of front forks, arranged in a plane essentially orthogonal to said frame, for gripping and supporting the load to be moved. The mast bears on the lower side the truck's two front wheels, coaxial therebetween, with possible motor means and motion-transmitting means in case of front-wheel driven or four-wheel driven truck. The mast is articulated with respect to the front part of the body in order to oscillate around a transversal axis substantially parallel to the one of the front wheels. Such oscillation is called "swinging" of the mast. The swinging is controlled by means of one or more operating cylinders, articulated at one end with respect to the body and at the other end with respect to the mast, around the respective transversal axes parallel to the articulation one of the mast.

For example, in case of a fork-lift truck with three wheels (thereof two front wheels and one rear wheel) and rear-wheel driven, the mast is articulated to the body by means of a transversal axis placed at intermediate height of the body, whereas the articulation axis of the operating cylinders with respect to the mast is substantially arranged in the base area or lower crosspiece of the latter. By means of such arrangement, the swinging operation allows to sensibly vary the pitch or wheelbase between the front wheels and the rear wheel or wheels, by correspondingly varying the centre of gravity of the load brought on the truck forks. Upon increasing the pitch, the front wheels move forward with respect to the body and the mast tilts slightly by approaching its upper crosspiece to the roof of the body: the load increases the truck stability. On the contrary, when the pitch between the wheels is reduced and the mast is made to swing forwards, the truck stability is guaranteed by the ballast.

In case, instead, of a fork-lift truck with three wheels (thereof two front wheels and one rear wheel) and front-wheel driven, the mast—which supports the driving wheels and the related motor and transmission means—is articulated with respect to the body around a transversal axis arranged near the wheel axis, whereas the articulation axis of the operating cylinders with respect to the mast is placed over the mast's articulation axis with respect to the body. In this case, the swinging operation cannot be performed by varying sensibly the pitch between the truck's wheels, thus loosing the advantages illustrated above.

Constructively, for each model of fork-lift truck it is possible assembling several types of masts, according to the operations to be carried out. However, as the front wheels are carried by the mast, the both front-wheel driven and rear-wheel driven truck can be finished only once the articulated connection of the mast with respect to the unitized body has occurred. Therefore, if one wish subsequently to change the mast—for example with another much higher one—it is necessary to disassemble not only the mast, but also the related motor and transmission means, with considerable technical and economical costs.

Furthermore, in order to meet the orders of potential customers, it is necessary to store a great number of wholly finished trucks with masts of different kinds, that is alternatively it is necessary to wait for the order of each customer in order to implement the truck according to his/her needs.

The present invention, starting from knowing such inconveniences, wishes to solve them.

An object of the present invention is to provide an electric fork-lift truck wherein the pitch or wheelbase between the front wheels and the rear one or ones can be varied, in order to swing the mast and this with front-wheel, rear-wheel or four-wheel drive.

Another object of the present invention is to provide an electric fork-lift truck with variable pitch between front and rear wheels, the structure thereof with related driving and idle wheels is independent from the mast, so as to allow the interchangebility of the mast itself in a simple and quick way.

Still another object of the present invention is to provide an electric fork-lift truck with variable pitch between front and rear wheels which can be implemented as autonomous and semi-movable structural unit, without the related mast, in order to ease the storage and the transportation and to allow assembling the mast of the wished type at time of choosing by the end user.

An additional object of the invention is to provide a process for producing an electric fork-lift truck with variable pitch between front and rear wheels, to allow implementing an autonomous and semi-movable structural unit, without the related mast, in order to ease the storage and the transportation and to allow assembling the mast of the wished type at time of choosing by the end user.

The present invention will better result from the following detailed description by referring to the enclosed drawings, provided by only way of example and not for limitative purposes, wherein.

Figure 1:
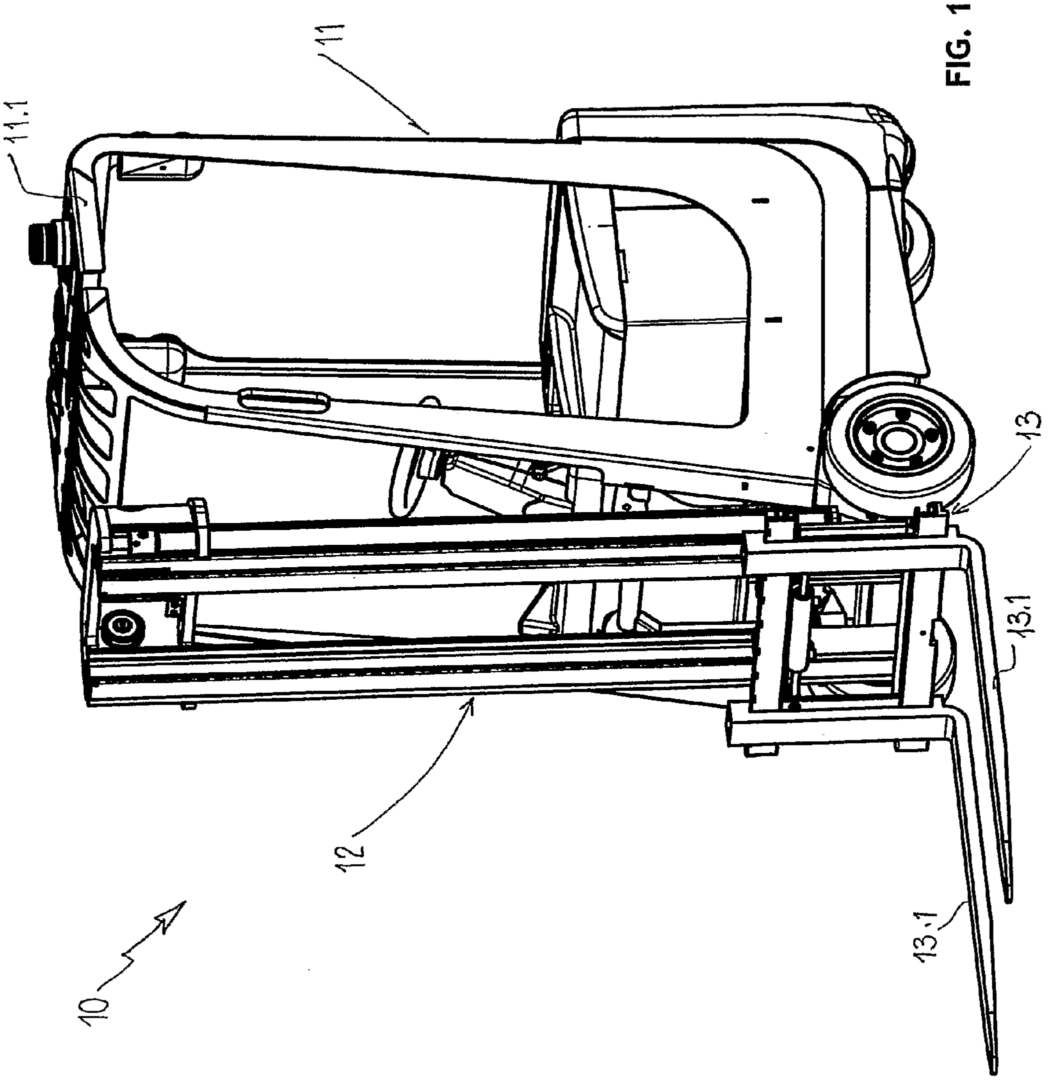
FIG. 1 is a three-quarter perspective, front view of an electric fork-lift truck with three wheels according to an embodiment of the present invention.
Figure 2:
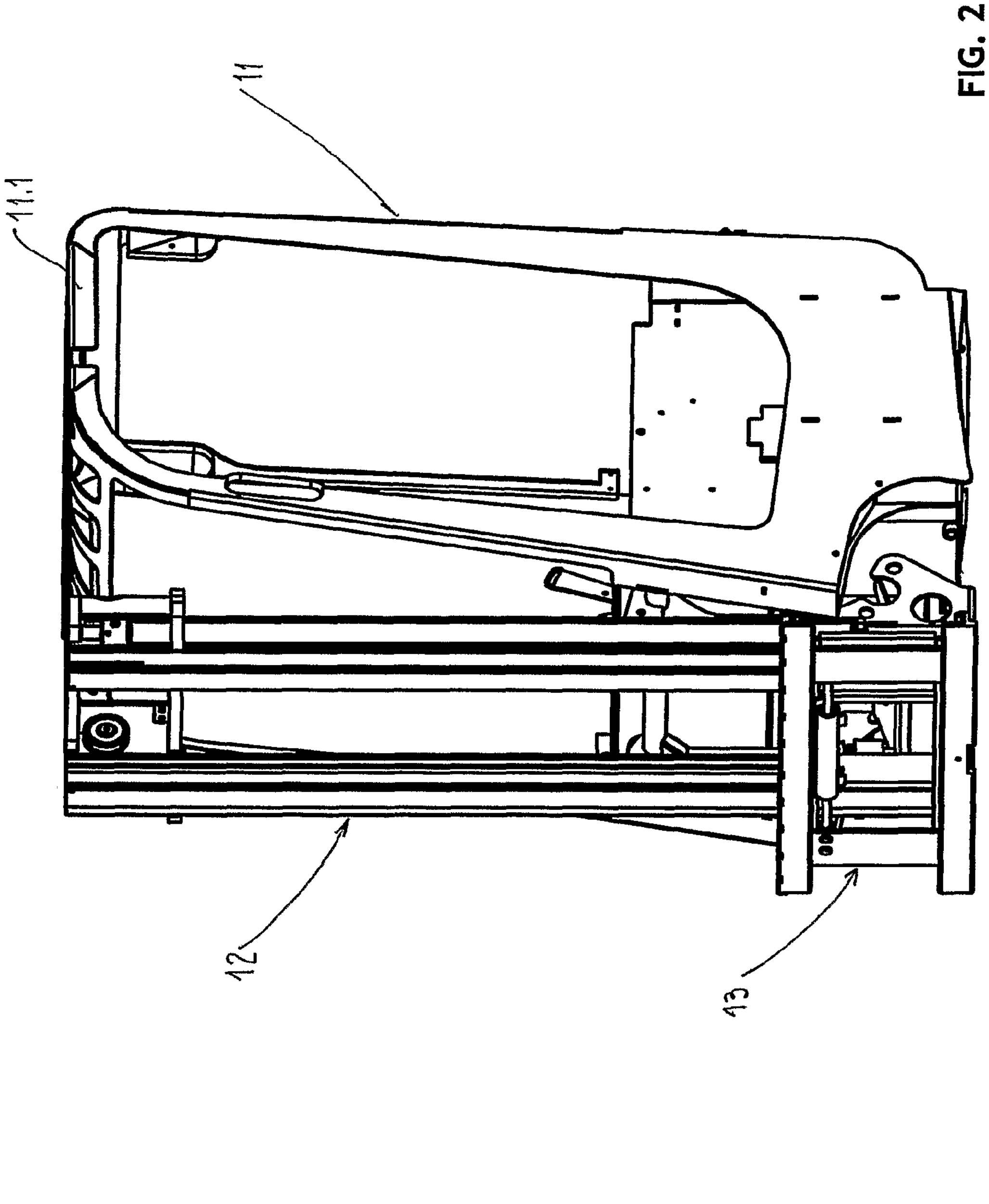
FIG. 2 is a view similar to that of FIG. 1, wherein, however, apart from other parts, also the mast's forks and the wheels are omitted, for illustrating clarity.

In the drawings, said three-wheel electric fork-lift truck is indicated as a whole with 10 (FIG. 1).

Figure 3:
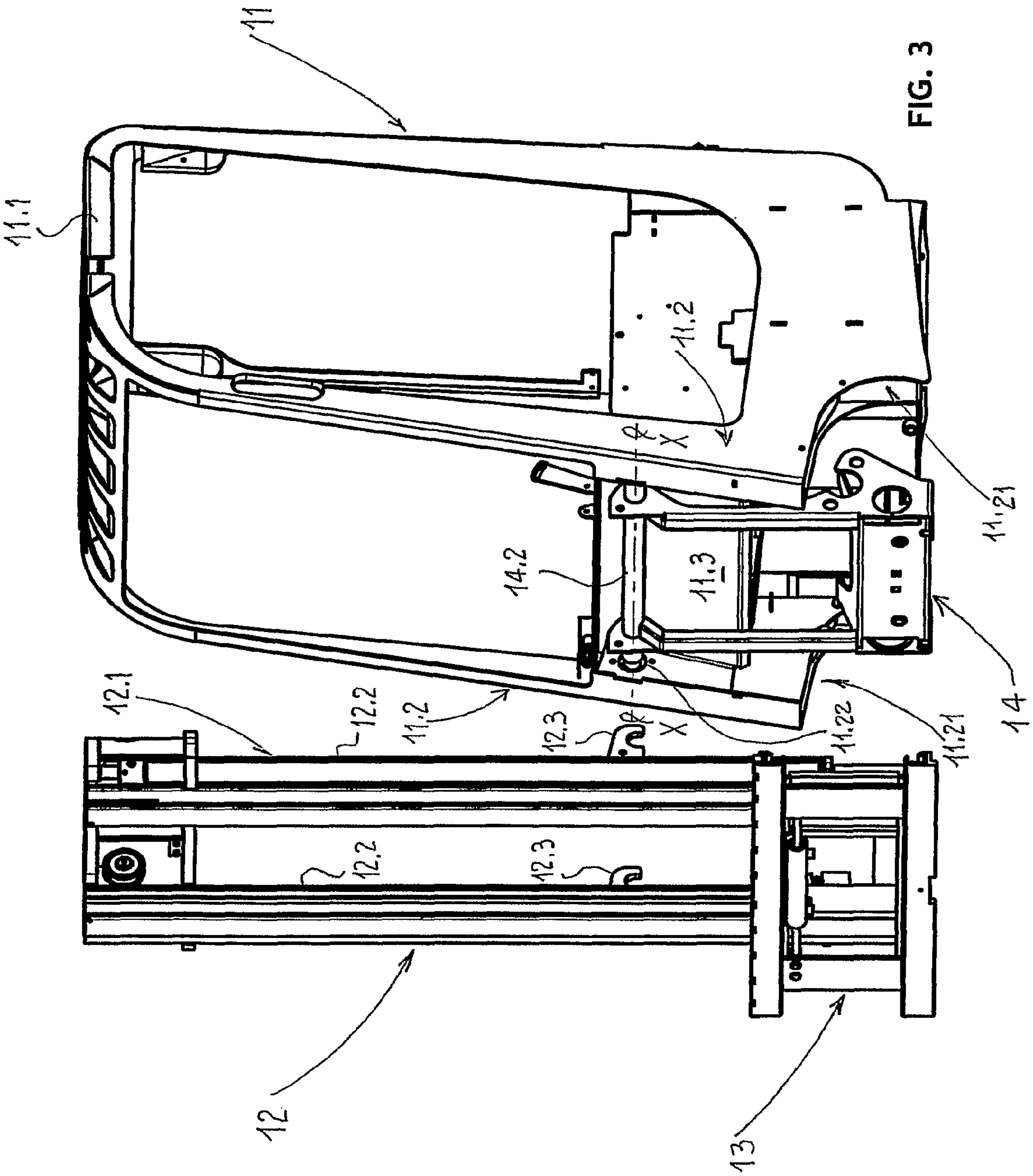
FIG. 3 shows, in an exploded perspective view, the truck of FIG. 2 with the mast separated from the body of the truck itself.
Figure 4:
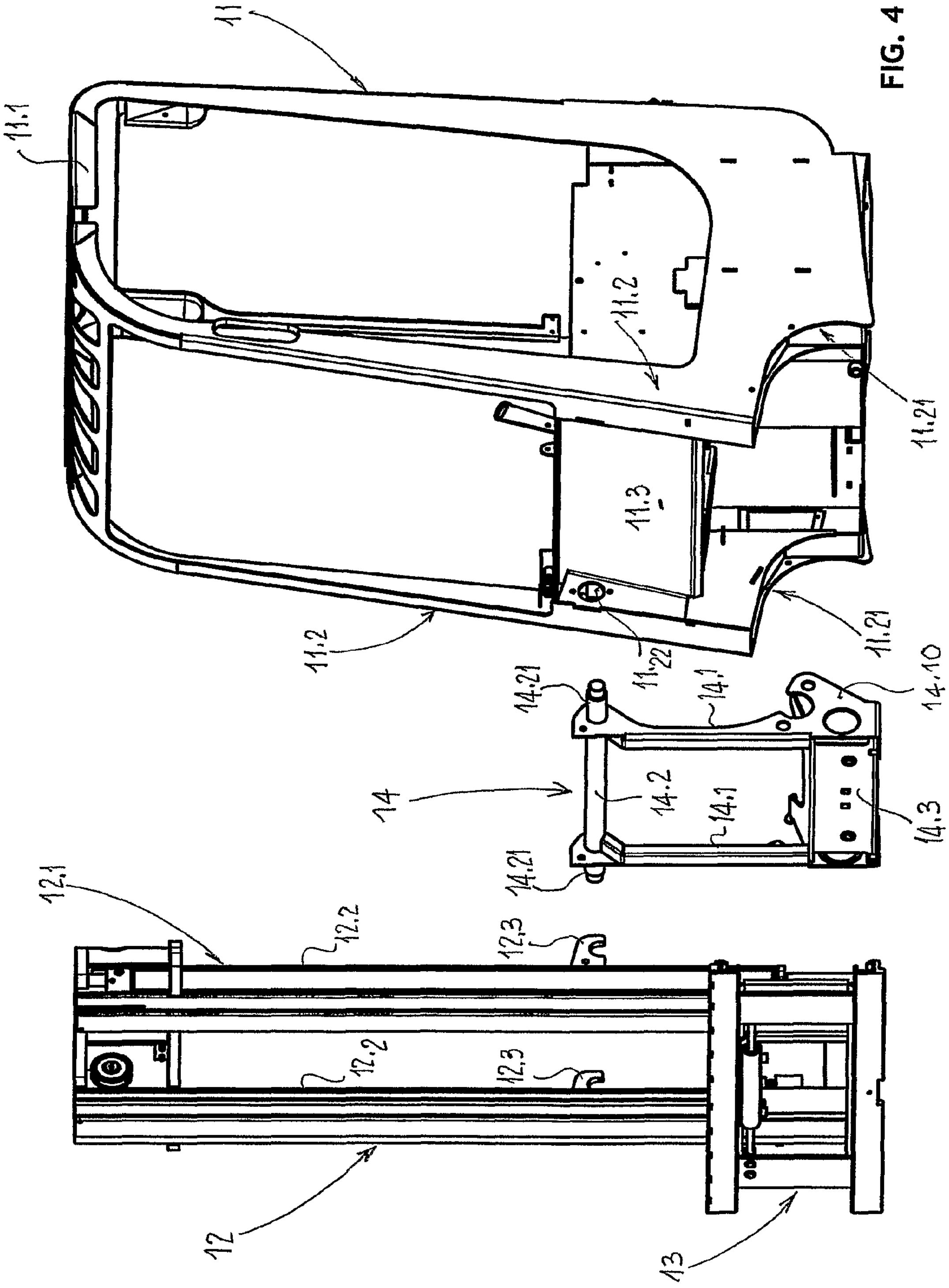
FIG. 4 is a perspective view similar to that of FIG. 3, wherein, however, between the body and the mast also an intermediate frame is illustrated in exploded view.

Said truck 10 comprises a unitized body 11 and a mast 12 (FIG. 3).

The unitized truck 11 is equipped with a safety roof 11.1 and includes, in a way known on itself and not further described, the operator compartment with related controls, hydraulic and electric circuits and control means, as well as the compartments housing the electric battery and the ballast.

The lateral sides 11.2 of the body 11 have, on the front side, a box-like body, by providing on the lower side respective wheelhouses 11.21 and contain a front plate 11.3 therebetween, partially re-entered the body and delimiting the lower area of the passenger compartment on the front side.

The mast 12 includes a stiff rectangular frame 12.1, equipped with two parallel vertical longitudinal members 12.2, extended in height and extensible vertically by means of an additional frame sliding along the longitudinal members themselves. A slide 13 is mounted on said shaft 12 sliding in vertical direction and bears a pair of front forks 13.1 (FIG. 1) arranged in a plane essentially orthogonal to said frame 12.1, for gripping and supporting the load to be moved.

According to the invention, a stiff intermediate frame 14 is arranged oscillating between the sides 11.2 of the body 11, in the front of said front plate 11.3.

Said frame 14 comprises (FIGS. 4, 8-13) two longitudinal members 14.1 mainly vertical in stamped plate, an upper crosspiece 14.2 with metallic cylindrical body, prolonged beyond the longitudinal members 14.1 by means of respective heads with reduced diameter 14.21 and a lower crosspiece 14.3 in metallic plate with box-like body opened on the rear side and parallel to the upper crosspiece. The heads 14.21 of the upper crosspiece of said frame 14 are housed freely rotating in respective bushes (known on themselves and not illustrated) fixed coaxially according to a transversal horizontal axis X-X (FIG. 3), in respective holes 11.22 (thereof only one is visible in the drawings) provided in said sides 11.2 of the body 11, so that said frame 14 can oscillate around said axis itself. The upper crosspiece 14.2 of the frame 14 is placed below the top of the front plate 11.3, whereas its lower crosspiece 14.3 is placed substantially in the compartment between the wheelhouses 11.21 of the body 11, without interfering with the same wheelhouses.

The longitudinal members 14.1 at the level of the lower crosspiece 14.3 have respective plate-like extensions 14.10 (FIG. 8), extended on the rear side according to respective planes orthogonal to the axis X-X. In said extensions 14.10 respective through holes 14.11 are provided for the assembly of corresponding bushes (known on themselves and not illustrated) aligned according to a horizontal transversal axis Y-Y, parallel to said axis X-X. Above said holes 14.11, respective notches 14.12, opened upwards, are provided in the extensions 14.10. Furthermore, on opposite sides with respect to said notches 14.12, two through holes 14.13 for assembly screws or bolts are provided in each extension 14.10.

Besides, respective through holes 14.14 for assembly screws or bolts are provided in the top area of said longitudinal members 14.1, whereas two through holes 14.30 for assembly screws or bolts are provided in the crosspiece 14.3. It will be noted that the axes of the holes 14.14 are parallel to the axis Y-Y, whereas those of the holes 14.30 are orthogonal to a plane passing through said axis itself.

In the intermediate axis 14 two idle wheels 21 are assembled coaxially therebetween, according to said axis Y-Y, housing the respective axes 21.1 within said bushes fastened in the holes 14.11 and by fixing to said frame 14 the respective supporting plates 21.2 by means of screws or bolts passing in the holes 14.13 and in corresponding holes 21.3 provided in said supporting plates 21.2 themselves. Said idle wheels 21 are arranged at the wheelhouses 11.21 of the body 11.

Alternatively (FIG. 9), in said intermediate frame 14 two individually motorized driving wheels 22 are assembled in a way wholly similar to said idle wheels 21. It will be noted that, in this case, the notch 14.12 of the extension 14.10 of each longitudinal member 14.1 houses a part of the geared-motor group MR associated to each driving wheel 22 so that said extension 14.10 acts as a holder of said geared-motor group MR. Also said driving wheels 22 are arranged at the wheelhouses 11.21 of the body 11 (FIG. 14).

Figure 6:
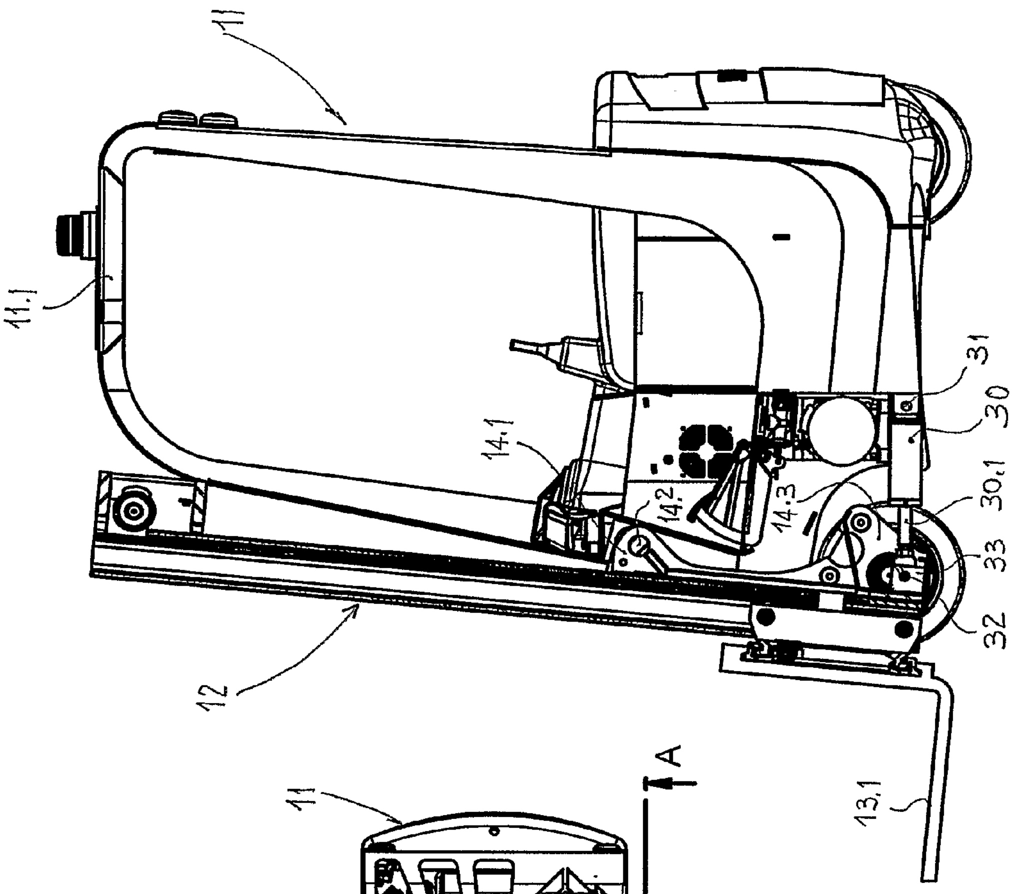
FIG. 6 is a section view according to line A-A of FIG. 5, showing the mast in an oscillating position swinging rearwards.
Figure 5:
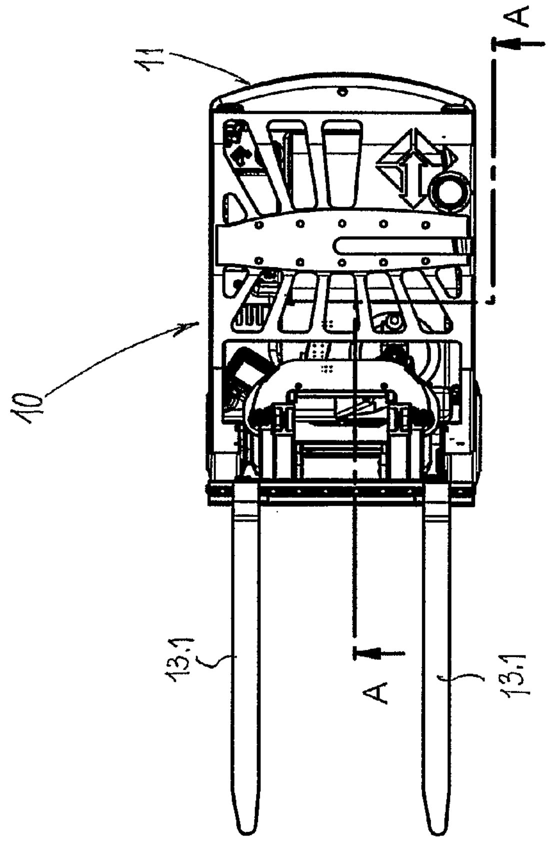
FIG. 5 is a top plan view, in different scale, of the truck of FIG. 1.
Figure 7:
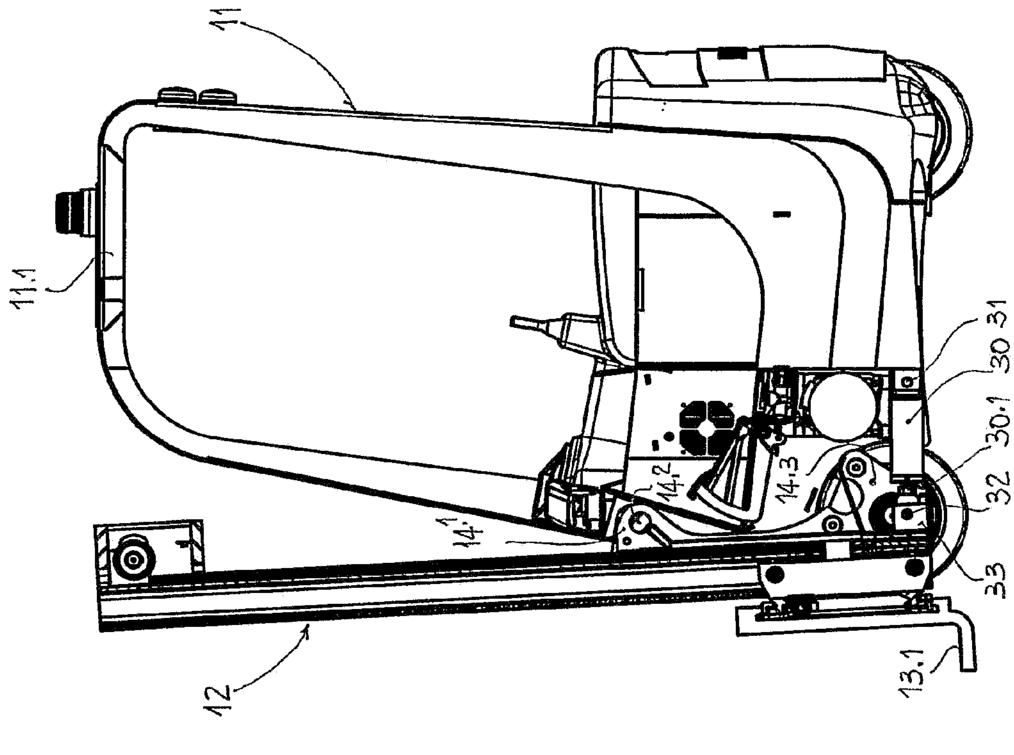
FIG. 7 is a view similar to that of FIG. 6, but showing the mast in oscillating position swinging forwards.
Figure 8:
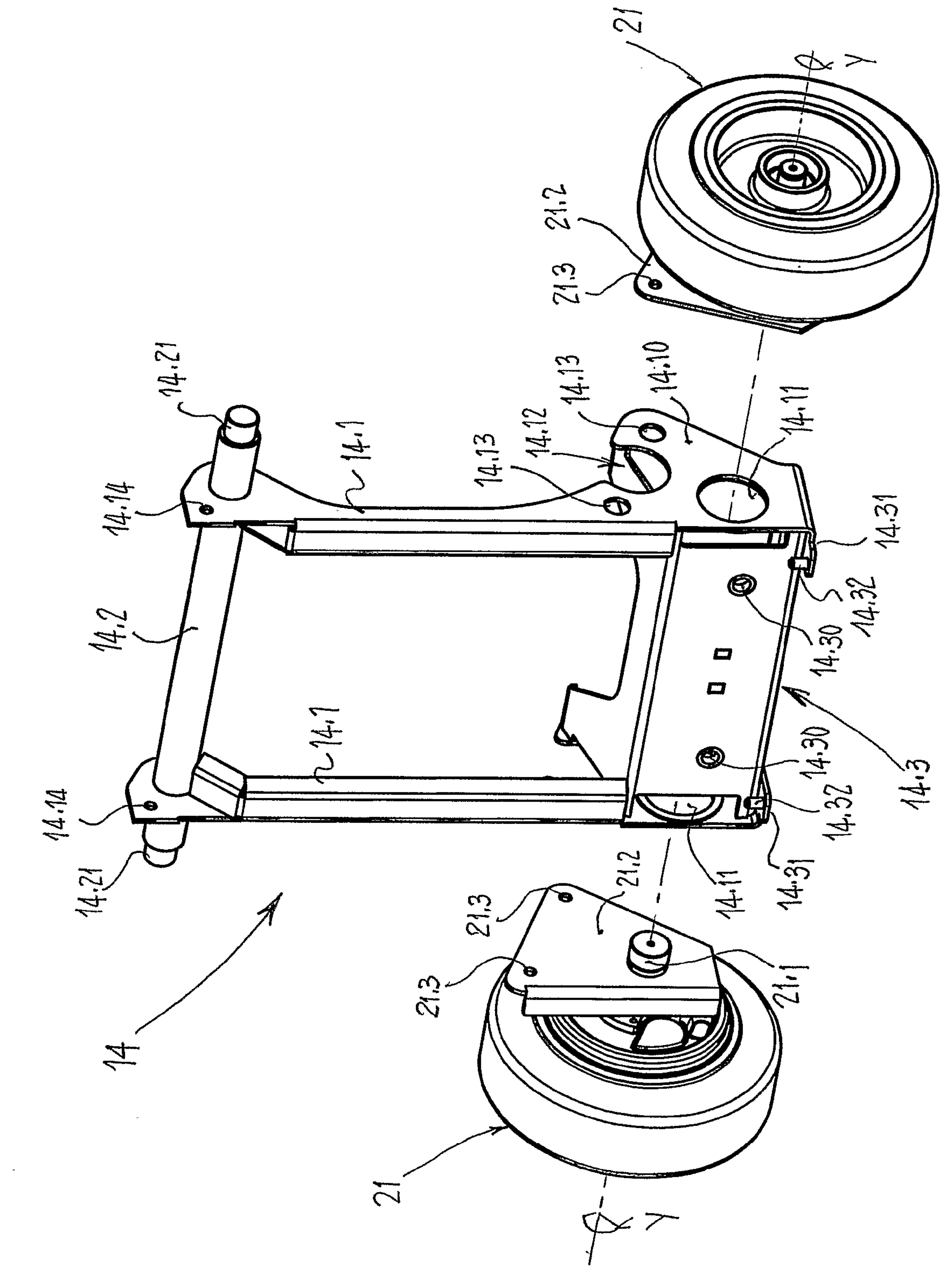
FIG. 8 is an exploded perspective view and in greater scale of said intermediate frame with two idle wheels.
Figure 9:
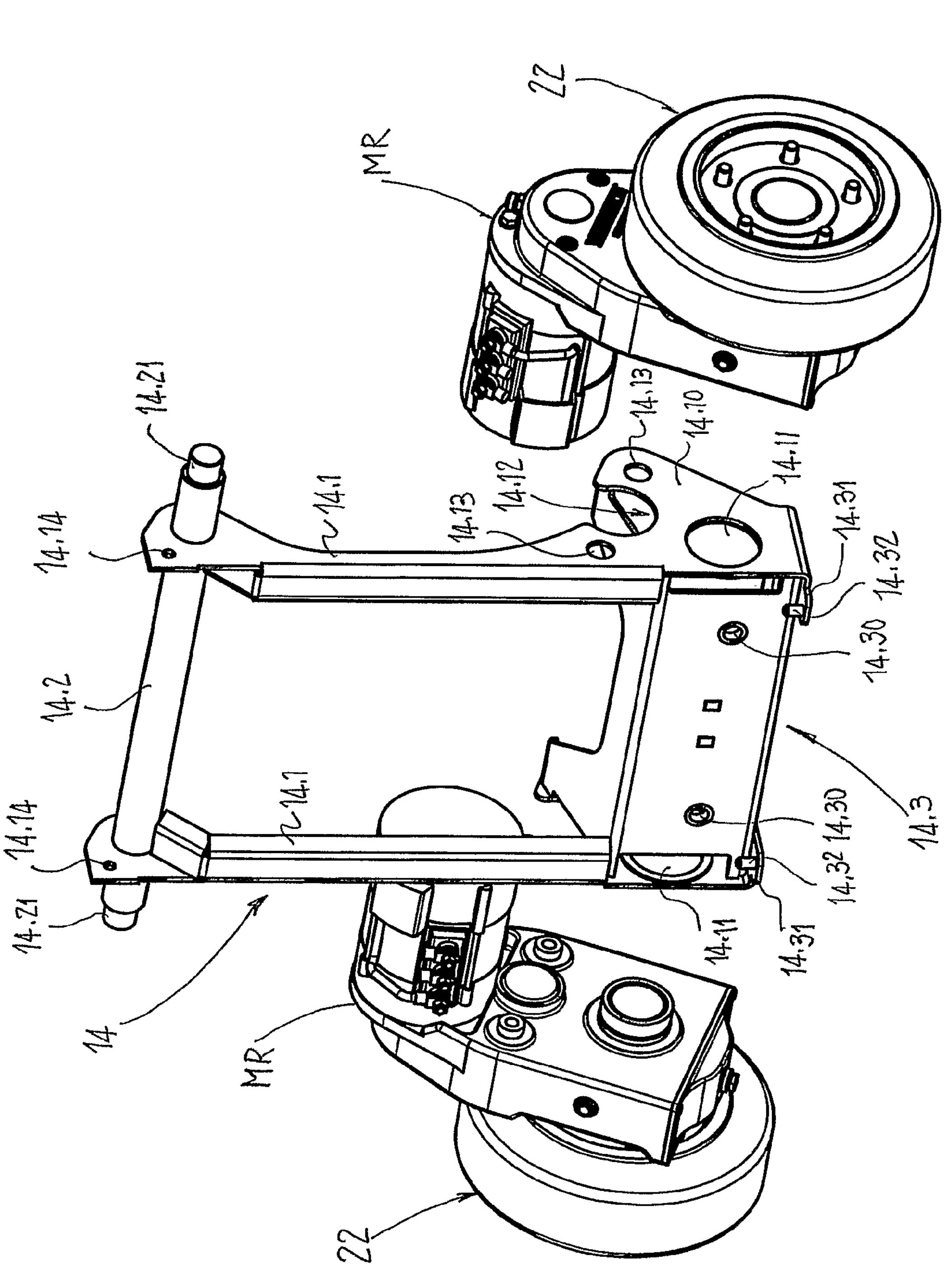
FIG. 9 is an exploded perspective view and in greater scale of said intermediate frame with two driving wheels and related motor and transmission means.
Figure 10:
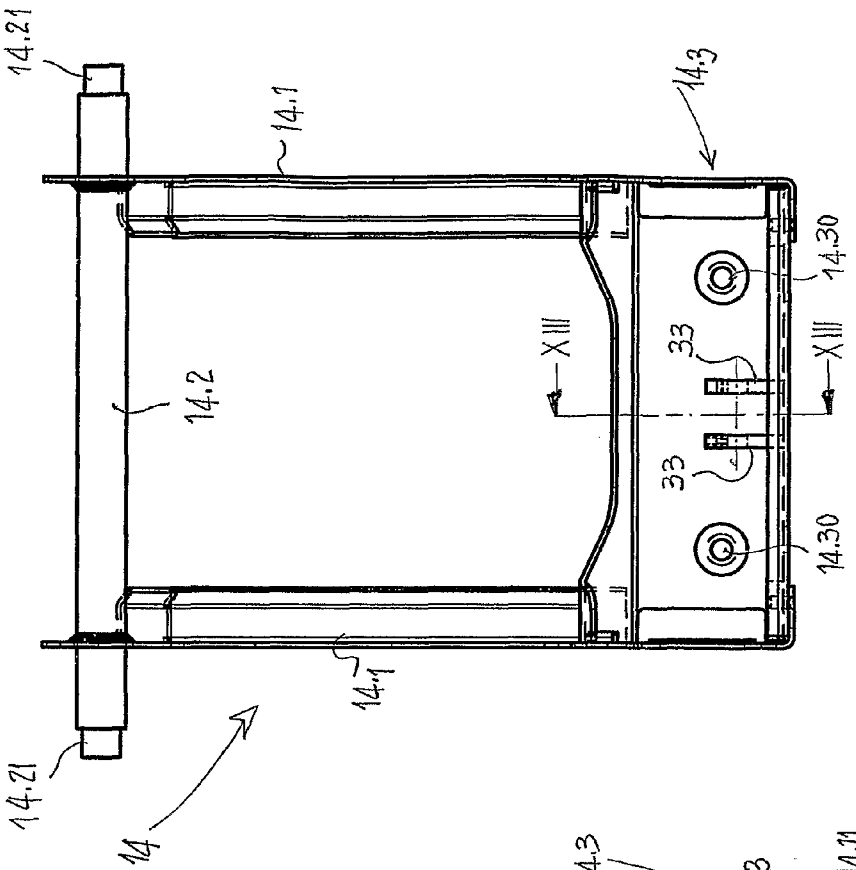
FIGS. 10, 11, 12 are views of said intermediate frame, respectively in back, side and plan elevations.
Figure 12:
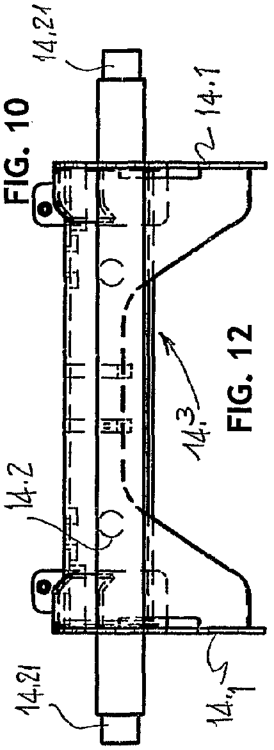
Figure 13:
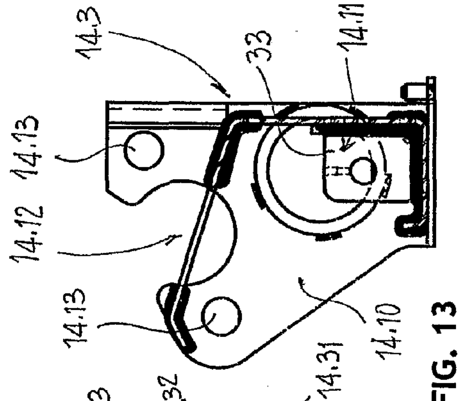
FIG. 13 is a section view in greater scale according to line XIII-XIII of FIG. 10.
Figure 11:
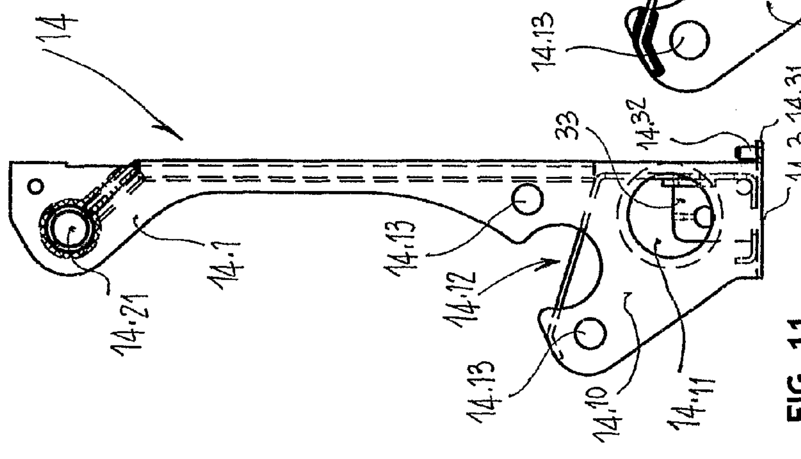

A hydraulic operating cylinder 30 (FIGS. 6, 7) is articulated with respect to the body 11, in the lower side and with the axis arranged in the longitudinal vertical median plane of the same, by means of a pin 31 with axis parallel to the axis X-X, whereas the stem thereof 30.1 is articulated to said intermediate frame 14 by means of a pin 32 with axis parallel to said axis X-X too. Said pin 32 is fastened between two vertical tongues 33 (FIGS. 10-13), welded inside the box-like lower crosspiece 14.3 of said intermediate frame 14. Said intermediate frame 14 can be then made to oscillate around said axis X-X by extending and retracting the stem 30.1 with respect to the hydraulic cylinder 30, which is operatively connected in the hydraulic circuit of the truck.

Figure 14:
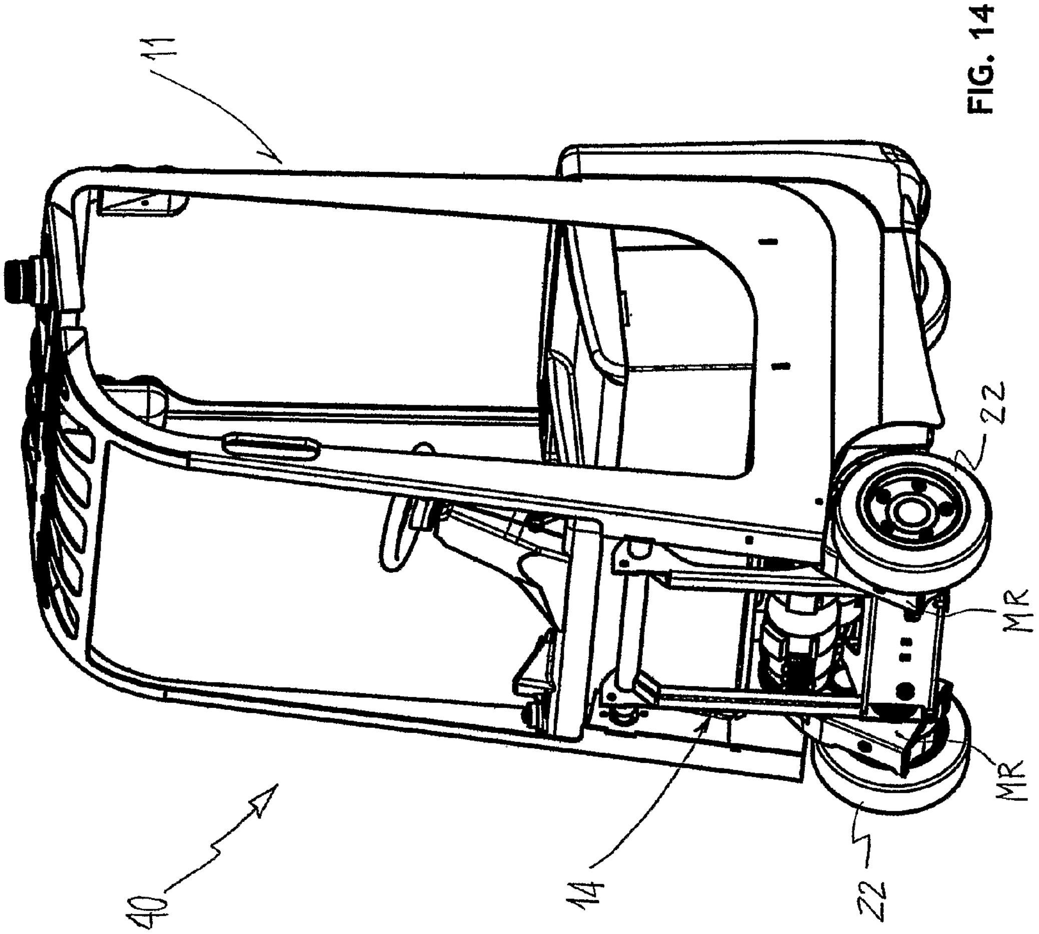
FIG. 14 is a three-quarter perspective, front view of the unitized body of the truck of FIG. 1, with related controls, circuits and control means and equipped with rear wheel and said intermediate frame with driving front wheels, implemented as autonomous and semi-movable structural unit, without the related mast.

As it appears from above and as illustrated in FIG. 14, the unitized body 11 with (driving or idle) rear wheel and with intermediate frame 14 equipped with (idle 21 or driving 22) front wheels constitutes a structurally autonomous and semi-movable unit 40, suitable for the storage and the transportation.

Besides, the longitudinal members 12.2 of the frame 12.1 of the mast 12 have respective supporting and anchoring rear fixed arms 12.3 (FIGS. 3,4) with ends with downward-opened hook and arranged at a height substantially corresponding to the one of the upper crosspiece 14.2 of the frame 14, once the mast 12 is assembled in the truck 10. Furthermore, two supporting brackets 14.31 (FIGS. 8, 9) project frontally on the lower side of the lower crosspiece 14.3 of the frame 14 and bear respective assembly pins 14.32 oriented upwards. Two corresponding assembly fixed joints (which cannot be seen in the drawings) are provided in the lower crosspiece of the frame 12.1 of the mast 12. By means of such arrangement the easy assembly of the mast 12 in said structural unit 40 can be performed in the following way: said mast 12 is shown with the back portion thereof opposed to the intermediate frame 14 assembled in the front portion of the body 11, by making the vertical pins 14.32 of said intermediate frame 14 to engage within the corresponding assembly fixed joints provided in the lower crosspiece of the frame 12.1 of said mast, whereas the supporting and anchoring arms 12.3 of the mast itself engage from the top and partially wind the upper crosspiece 14.2 of said intermediate frame 14. Then, the mast 12 is fastened with respect to said intermediate frame 14, by clamping screws or bolts the shanks thereof are arranged to pass, on one side, through the assembly holes 14.14 in the longitudinal members 14.1 of the intermediate frame 14 and corresponding holes in said mast and, on the other side, through the holes 14.30 in the lower crosspiece 14.3 of said intermediate frame 14 and corresponding holes in said mast.

With reverse operation, the disassembly of said mast 12 is performed.

The mast 12 thus results to be easily disassembled for maintenance or replacement by other mast.

Said mast 12, once assembled, can be made to oscillate integrally with said intermediate frame 14 around the axis X-X by means of said operating cylinder 30 so as to perform the forward and rearward swinging, according to need. Such operation can be carried out with both idle 21 and driving 22 front wheels.

The process for manufacturing the fork-lift truck according to the invention mainly comprises the following steps:

- assembly of the idle 21 or driving 22 front wheels of the truck onto the intermediate frame 14, in the last case the wheels being equipped with the respective motor and motion transmission means MR;
- assembly of the intermediate frame 14 in the lower portion of a unitized body 11, assembled and equipped at least with a directional rear wheel and with the related controls, circuits and control means, by means of housing the heads 14.21 of the upper crosspiece thereof 14.2 in corresponding bushes, fastened coaxially, according to said transversal horizontal axis X-X (FIG. 3), in the respective holes 11.22 provided in the sides 11.2 of the body 11, so that said frame 14 can oscillate around said axis itself;
- assembly of the operating cylinder 30, which is connected on one side to the body 11 and on the other side to said intermediate frame 13, in the lower areas of the same, in an articulated way around respective axes 31, 32 parallel to said axis X-X, thus implementing a structurally autonomous and movable/semi-movable unit (for example, the unit 40 of FIG. 14), suitable for the storage and the transportation, and a final step for assembling in a dismountable way said mast 12 onto said intermediate frame 14.

In particular, this last step is carried out in the following way:

said mast 12 is shown with the back portion thereof opposed to the intermediate frame 14 assembled in the front portion of the body 11, by making the vertical pins 14.32 of said intermediate frame 14 to engage within the corresponding assembly fixed joints provided in the lower crosspiece of the frame 12.1 of said mast, whereas the supporting and anchoring arms 12.3 of the mast itself engage from the top and partially wind the upper crosspiece 14.2 of said intermediate frame 14. Then, the mast 12 is fastened with respect to said intermediate frame 14, by clamping screws or bolts the shanks thereof are arranged to pass, on one side, through the assembly holes 14.14 in the longitudinal members 14.1 of the intermediate frame 14 and corresponding holes in said mast and, on the other side, through the holes 14.30 in the lower crosspiece 14.3 of said intermediate frame 14 and corresponding holes in said mast.

ADVANTAGES OF THE INVENTION

As it results from above, the present invention allows achieving the objects illustrated in the premises.

In particular, the electric fork-lift truck, according to the invention:

- allows varying the pitch or wheelbase between the front wheels and the rear one or ones in order to swing the mast, both front-wheel and rear-wheel or four-wheel driven,
- comprises a structure with related driving or idle wheels, independent from the mast, so as to allow the assembly, the disassembly or the interchangeability of the mast itself in an easy and quick way;
- is implemented as an autonomous and movable/semi-movable structural unit, without the related mast in order to ease the storage and transportation thereof and to allow assembling the mast of the wished type at time of choosing by the end user.

Furthermore, the process for manufacturing the truck according to the invention makes easier the operations for manufacturing the truck and allows implementing an autonomous and movable/semi-movable structural unit, without the related mast so as to ease the storage and transportation thereof and to allow assembling the mast of the desired type at time of choosing by the end user.

The invention claimed is:

1. An electric fork-lift truck, comprising a unitized body equipped with one or more directional rear wheels and with a safety roof and including the passenger compartment for the operator with related controls and hydraulic and electric circuits, as well as compartments for housing an electric battery and a ballast and a mast extended in height and which in case can be elongated vertically, whereon a slide is assembled sliding in vertical direction and bearing front forks for gripping and supporting the load to be moved, characterized in that it comprises an intermediate frame (14), bearing idle or driving front wheels (21, 22) of the truck and assembled with respect to said body (11) in an oscillating way around a transversal axis (X-X) parallel to the axis (Y-Y) of said front wheels, in that an operating-cylinder (30), operatively connected in the truck's hydraulic circuit, is articulated on one side with respect to said body (11) and, on the other one, with respect to said intermediate frame (14), by respective axes parallel to said transversal axis (X-X) so that said unitized body (11) equipped with said intermediate frame (14) with front wheels, constitutes a structural autonomous and movable/semi-movable unit (40), suitable for storage and transportation and wherein a pitch or a wheelbase between the front wheels and the rear wheel or wheels is selectively variable by oscillating said intermediate frame (14) around said transversal axis (X-X) by said operating-cylinder (30) and in that said mast (12) is dismountably fastened to said intermediate frame (14) so that said mast (12) can be made to oscillate integrally with the intermediate frame (14) itself around said transversal axis (X-X), by said operating-cylinder (30) to swing forwards and rearwards, with both idle (21) and driving (22) front wheels, whereas said mast (12) can be disassembled and assembled easily with respect to said intermediate frame (14).

2. The fork-lift truck according to claim 1, characterized in that said intermediate frame (14) is arranged oscillating between the sides (11.2) of said body (11), in the front portion of the same.

3. The fork-lift truck according to claim 1, characterized in that said intermediate frame (14) comprises two mainly vertical longitudinal members (14.1), a cylindrical body upper crosspiece (14.2), prolonged beyond the longitudinal members (14.1) by respective heads (14.21) and a boxlike lower crosspiece (14.3) parallel to the upper crosspiece, in that said heads (14.21) of the upper crosspiece are housed freely rotating, according to said transversal axis (X-X), in respective holes (11.22) provided in said sides (11.2) of the body (11)

and in that said lower crosspiece (14.3) is placed substantially in the compartment between the wheelhouses (11.21) of the body (11), without interfering with the wheelhouses themselves.

4. The fork-lift truck according to claim 1, characterized in that said longitudinal members (14.1) of the intermediate frame (14) have, at the level of said lower crosspiece (14.3) respective plate-like extensions (14.10) wherein respective through holes (14.11) are provided for assembling said front wheels (21; 22) aligned according to said transversal axis (Y-Y).

5. The fork-lift truck according to claim 4, characterized in that in said extensions (14.10), above said holes (14.11), respective notches (14.12), opened upwards, are provided so as to house and support a portion of a geared-motor group (MR) associated to each driving front wheel (22).

6. The fork-lift truck according to claim 1, characterized in that said mast (12) comprises supporting and anchoring means (12.3) which engage, in a dismountable way, an upper portion (14.2) of said intermediate frame (14) which supports from the bottom the mast itself by means of at least a lower portion thereof (14.3, 14.31, 14.32).

7. The fork-lift truck according to claim 1, characterized in that said mast (12) comprises supporting and anchoring fixed rear arms (12.3) with ends with downward-opened hook and arranged at a height substantially corresponding to that of said upper crosspiece (14.2) of the intermediate frame (14), once the mast is assembled in the truck (10).

8. The fork-lift truck according to claim 6, characterized in that said intermediate frame (14) comprises at least a supporting bracket (14.31) extended frontally on the lower side of said lower crosspiece (14.3) and bearing an assembly pin (14.32) projected upwards, which engages a corresponding assembly fixed joint provided in the lower portion of said mast (12).

9. A process for manufacturing the electric fork-lift truck according to claim 1, characterized in that it comprises the following steps:

assembly onto the intermediate frame (14) of the idle (21) or driving (22) front wheels of the truck, the latter being equipped with the respective motor and motion transmittor (MR);

assembly of said intermediate frame (14) in a unitized body (11), equipped at least with a directional rear wheel and with the related controls and hydraulic and electric circuits, so that said frame (14) can oscillate around a transversal axis (X-X) parallel to the axis (Y-Y) of said front wheels (21; 22);

assembly of said operating-cylinder (30), operatively connected in the hydraulic circuit of the truck and articulated, on one side, with respect to said body (11) and, on the other side, with respect to said intermediate frame (14), by respective axes parallel to said transversal axis (X-X), implementing a structurally autonomous and movable/semi-movable unit (40), suitable for storage and transportation, and wherein the pitch or the wheelbase between the front wheels and the rear one or ones is selectively variable by oscillation of said intermediate frame (14) around said transversal axis (X-X) by said operating-cylinder (30), and a final step for assembling in a dismountable way said mast (12) onto said intermediate frame (14).

10. The process for manufacturing an electric fork-truck lift according to claim 9, characterized in that in said final step, said mast (12) is shown with the back portion thereof opposed to said intermediate frame (14) assembled in the front portion of said body (11), by making one or more vertical pins (14.32), projected from at least a supporting bracket (14.31) extended frontally from the lower portion (14.3) of said intermediate frame (14), to engage within the corresponding assembly fixed joints provided in the lower portion of said mast (12), whereas supporting and anchoring arms (12.3), projected on the rear side from said mast (12), engage from the top and partially wind the upper crosspiece (14.2) of said intermediate frame (14), and in that then said mast (12) is fastened with respect to said intermediate frame (14), by clamping screws or bolts the shanks thereof are arranged to pass through the assembly holes (14.14, 14.30) provided in said intermediate frame (14) and corresponding assembly holes provided in said mast (12).

11. The process for manufacturing an electric fork-lift truck according to claim 9, characterized in that the assembly of said intermediate frame (14) in said body (11) is carried out by housing opposed heads (14.21) extended from the upper crosspiece (14.2) of said frame itself (14) at holes (11.22) provided in sides (11.2) of the body itself and aligned according to said transversal axis (X-X).

* * * * *